United States Patent
Herbert

(10) Patent No.: US 7,564,706 B1
(45) Date of Patent: Jul. 21, 2009

(54) POWER FACTOR CORRECTED SINGLE-PHASE AC-DC POWER CONVERTER USING NATURAL MODULATION

(76) Inventor: Edward Herbert, 1 Dyer Cemetery Rd., Canton, CT (US) 06019-2029

(*) Notice: Subject to any disclaimer, the term of this patent is extended or adjusted under 35 U.S.C. 154(b) by 211 days.

(21) Appl. No.: 11/767,704

(22) Filed: Jun. 25, 2007

Related U.S. Application Data

(63) Continuation-in-part of application No. 11/767,516, filed on Jun. 24, 2007.

(60) Provisional application No. 60/805,715, filed on Jun. 23, 2006, provisional application No. 60/807,056, filed on Jul. 11, 2006, provisional application No. 60/807,499, filed on Jul. 16, 2006, provisional application No. 60/820,993, filed on Aug. 1, 2006, provisional application No. 60/866,613, filed on Nov. 21, 2006, provisional application No. 60/890,539, filed on Feb. 19, 2007.

(51) Int. Cl.
  *H02M 7/00* (2006.01)
  *H02M 7/217* (2006.01)
  *H02M 7/04* (2006.01)
  *H02M 5/40* (2006.01)
  *H02M 1/12* (2006.01)
  *G05F 1/00* (2006.01)

(52) U.S. Cl. .......................... 363/124; 363/34; 363/44; 363/98; 363/125; 363/127; 323/222

(58) Field of Classification Search .................. 363/34, 363/44, 124, 125, 127, 89; 323/222
See application file for complete search history.

(56) References Cited

U.S. PATENT DOCUMENTS

| | | | | |
|---|---|---|---|---|
| 5,471,117 A * | 11/1995 | Ranganath et al. | .......... | 315/247 |
| 5,502,630 A * | 3/1996 | Rokhvarg | .................... | 363/84 |
| 5,867,379 A * | 2/1999 | Maksimovic et al. | ......... | 363/89 |
| 5,920,471 A * | 7/1999 | Rajagopalan et al. | ......... | 363/89 |
| 6,069,801 A * | 5/2000 | Hodge et al. | ............. | 363/21.02 |
| 6,297,980 B1 * | 10/2001 | Smedley et al. | ............... | 363/89 |

(Continued)

*Primary Examiner*—Akm E Ullah
*Assistant Examiner*—Jue Zhang

(57) ABSTRACT

A power factor corrected (pfc) ac-dc converter has a modified boost input and a modified buck output. Unlike the prior art boost input, the boost switch returns to the output, not to ground. Unlike the prior art buck output stage, a third switch connects to the input. This allows much of the input current to pass through the converter to the output. There is no input current measurement, but nearly ideal power factor correction is achieved through "natural modulation." A preferred pfc ac-dc converter uses a variable dc-dc transformer on its output, as a post regulator, to provide dielectric isolation and to provide voltage level shifting. The output of the pfc ac-dc converter has the control characteristics of a buck converter, so it is a natural mate for the variable dc-dc transformer. An ac-dc buck converter is most efficient at its maximum duty cycle. It cannot regulate for a lower input voltage, but it can reduce its duty-cycle to control for higher input voltages. A variable dc-dc transformer is most efficient at its maximum ratio. It cannot regulate for a higher input voltage, but it can reduce its effective turns ratio to control for a lower input voltage. With a small overlap in their control ranges, both parts of the power system can operate at maximum efficiency. The variable dc-dc transformer controls the output voltage for nominal and low input voltage. The ac-dc buck converter limits over-voltage transients.

22 Claims, 9 Drawing Sheets

U.S. PATENT DOCUMENTS

| | | |
|---|---|---|
| 6,330,170 B1 * | 12/2001 | Wang et al. ............ 363/37 |
| 6,504,132 B1 * | 1/2003 | Church ............ 363/89 |
| 6,545,887 B2 * | 4/2003 | Smedley et al. ............ 363/89 |
| 6,690,589 B2 * | 2/2004 | Barnett et al. ............ 363/72 |
| 6,906,933 B2 * | 6/2005 | Taimela ............ 363/37 |
| 2005/0212501 A1 * | 9/2005 | Acatrinei ............ 323/283 |

* cited by examiner

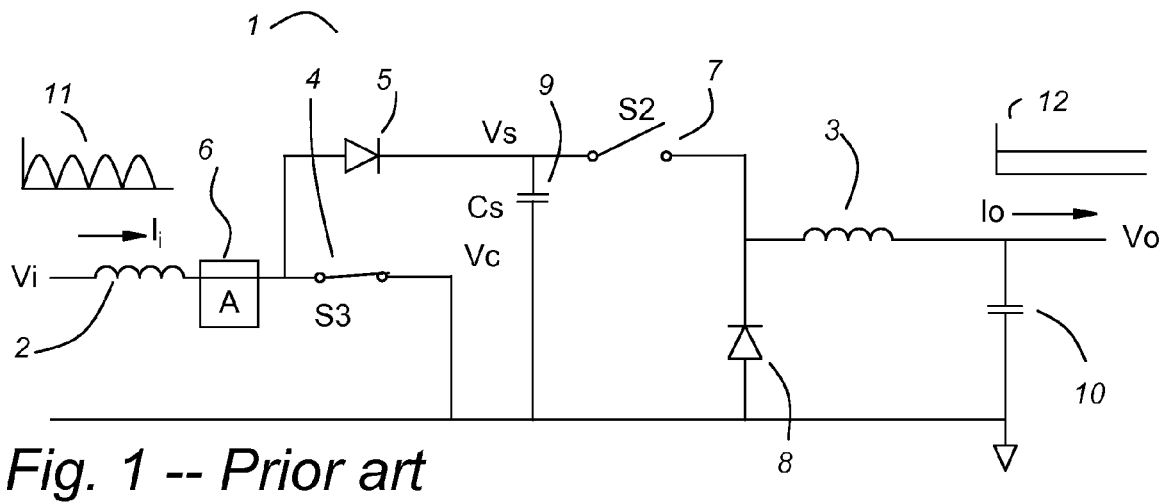
Fig. 1 -- Prior art
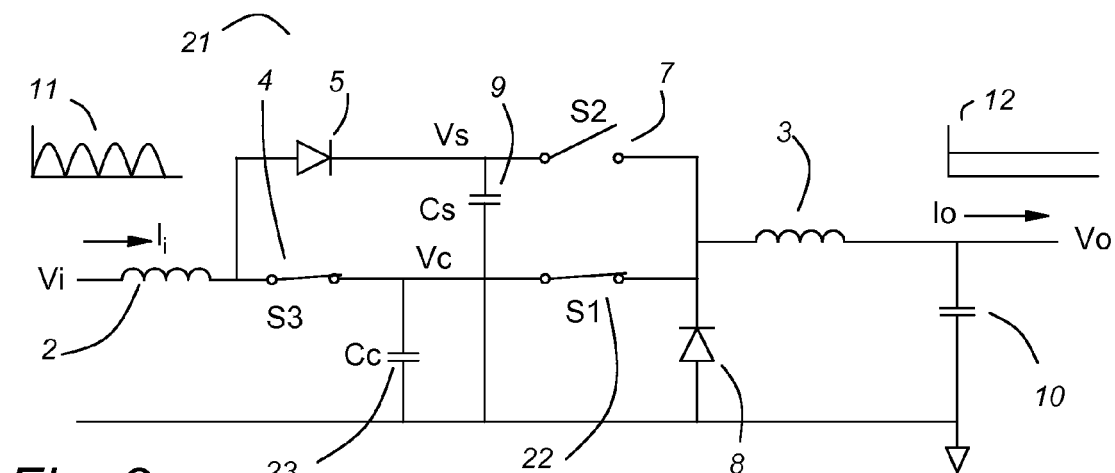
Fig. 2
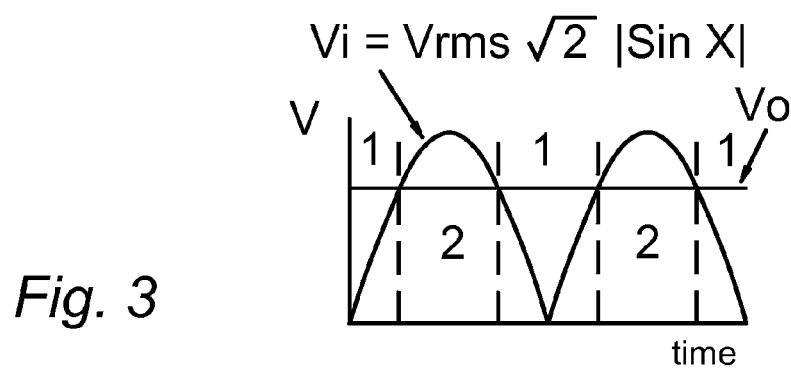
Fig. 3

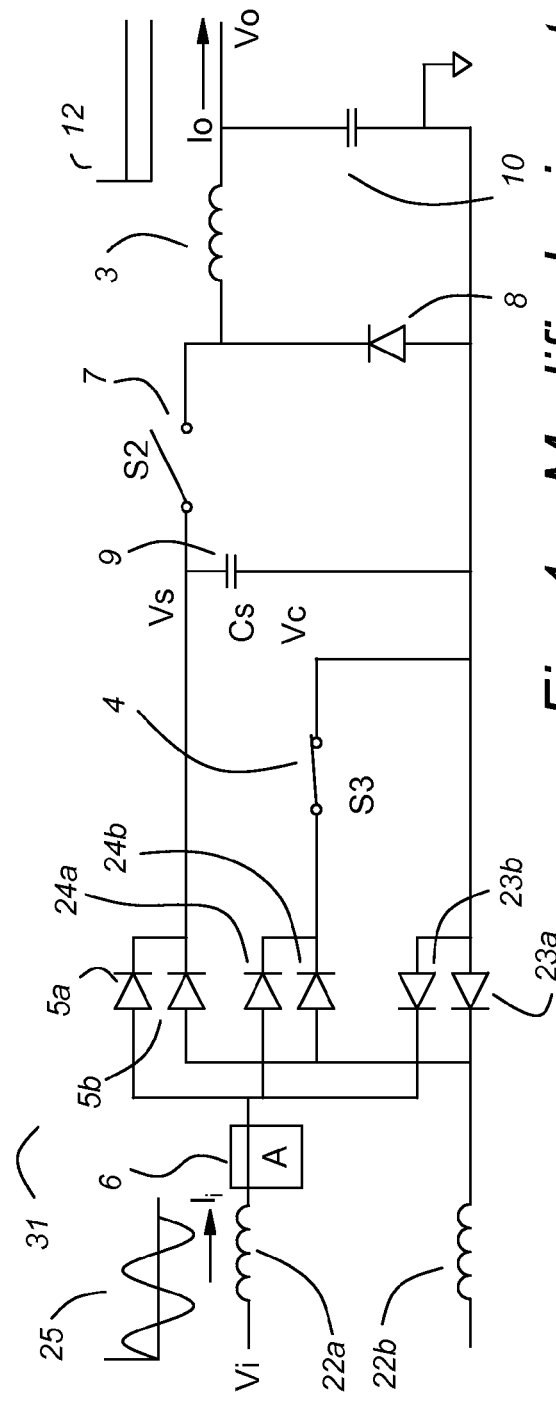
*Fig. 4 -- Modified prior art*
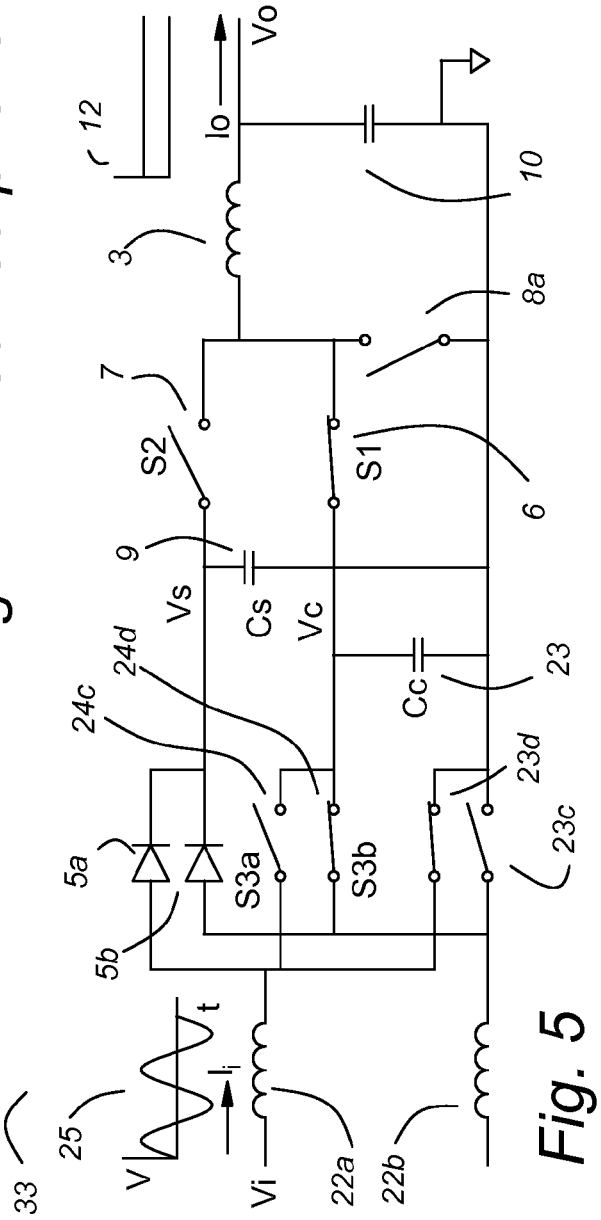
*Fig. 5*

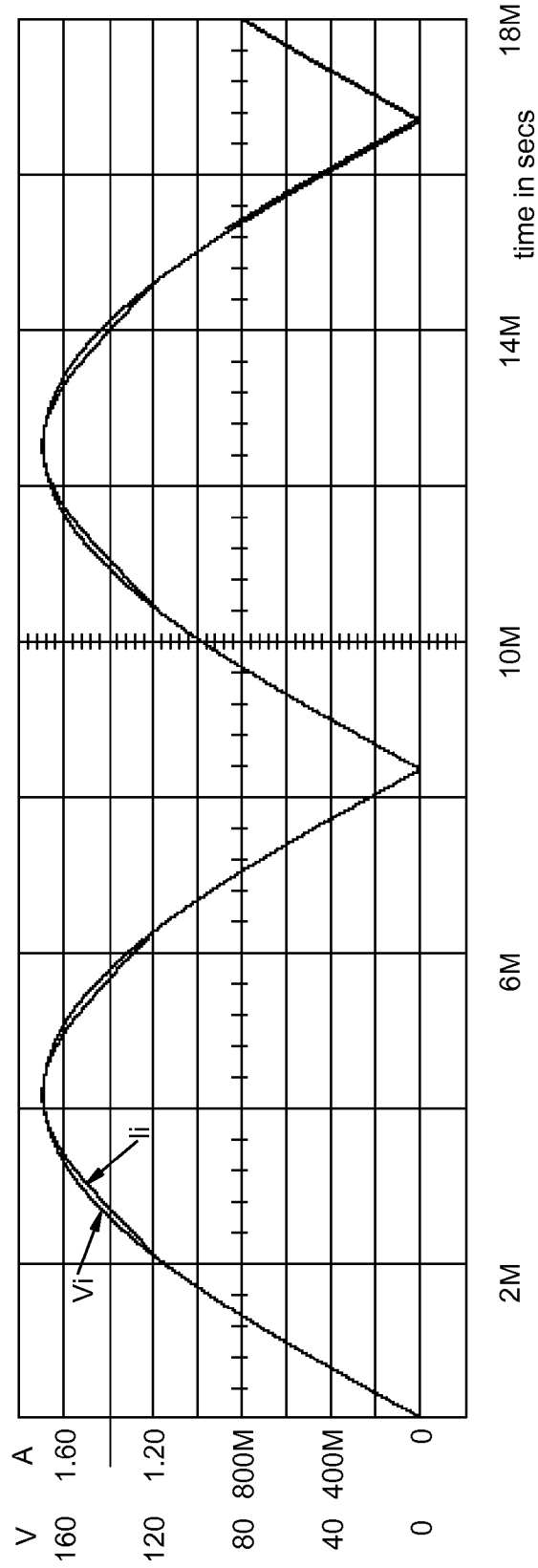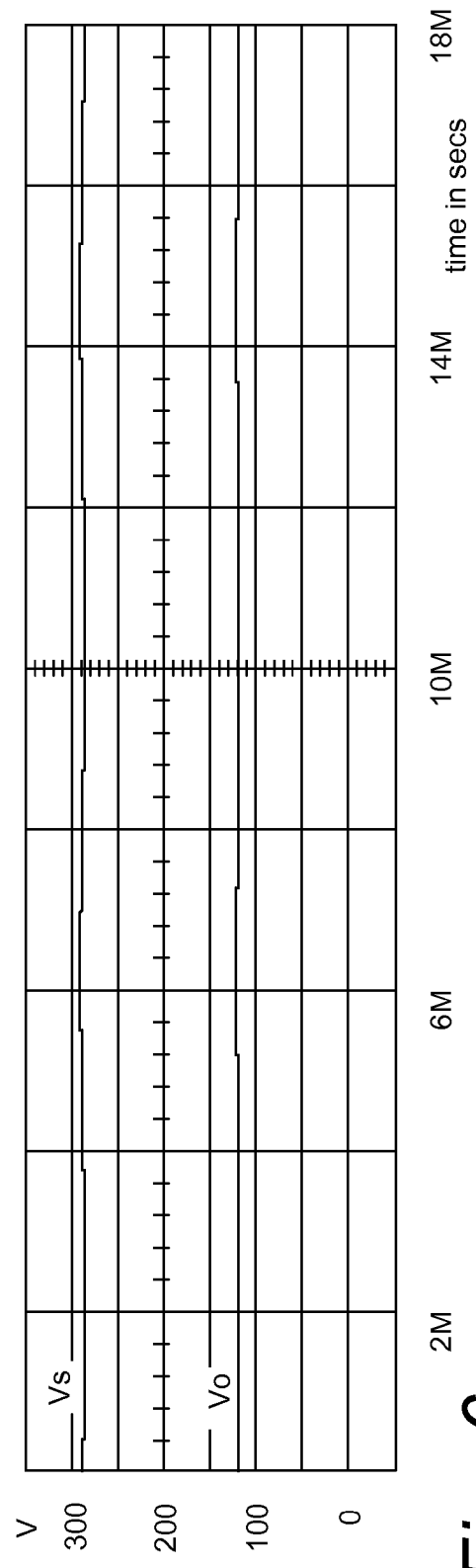
Fig. 6

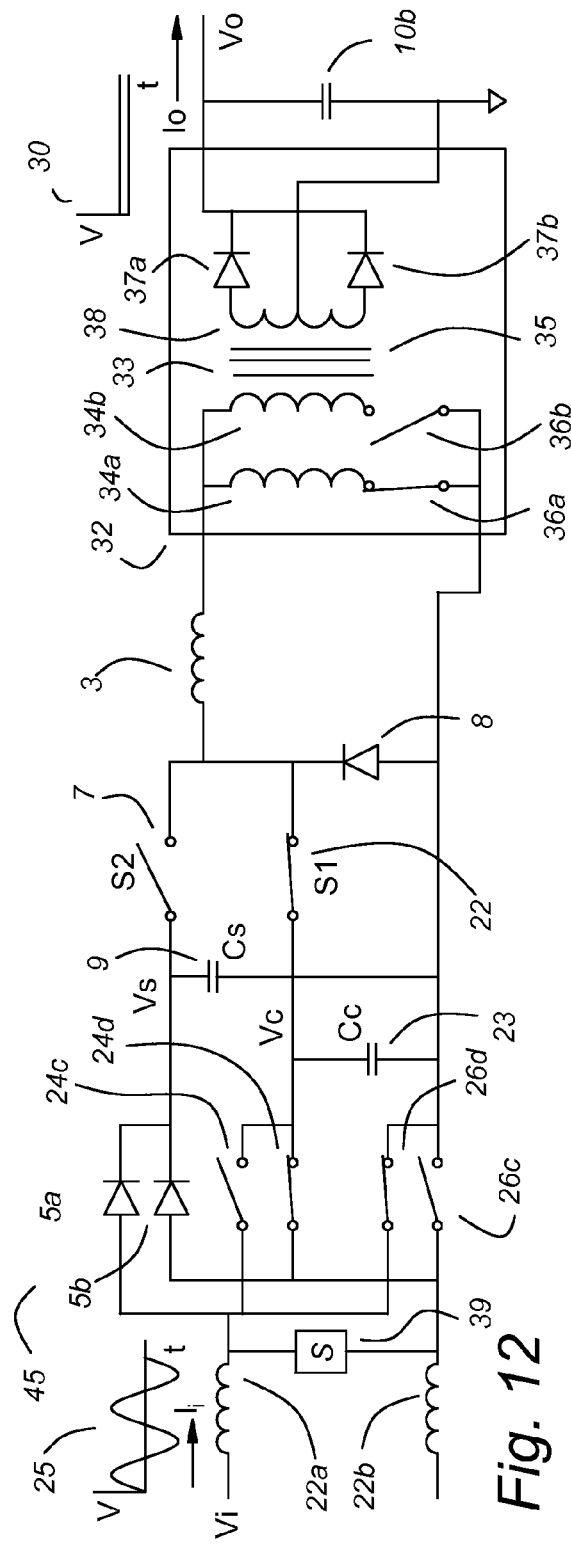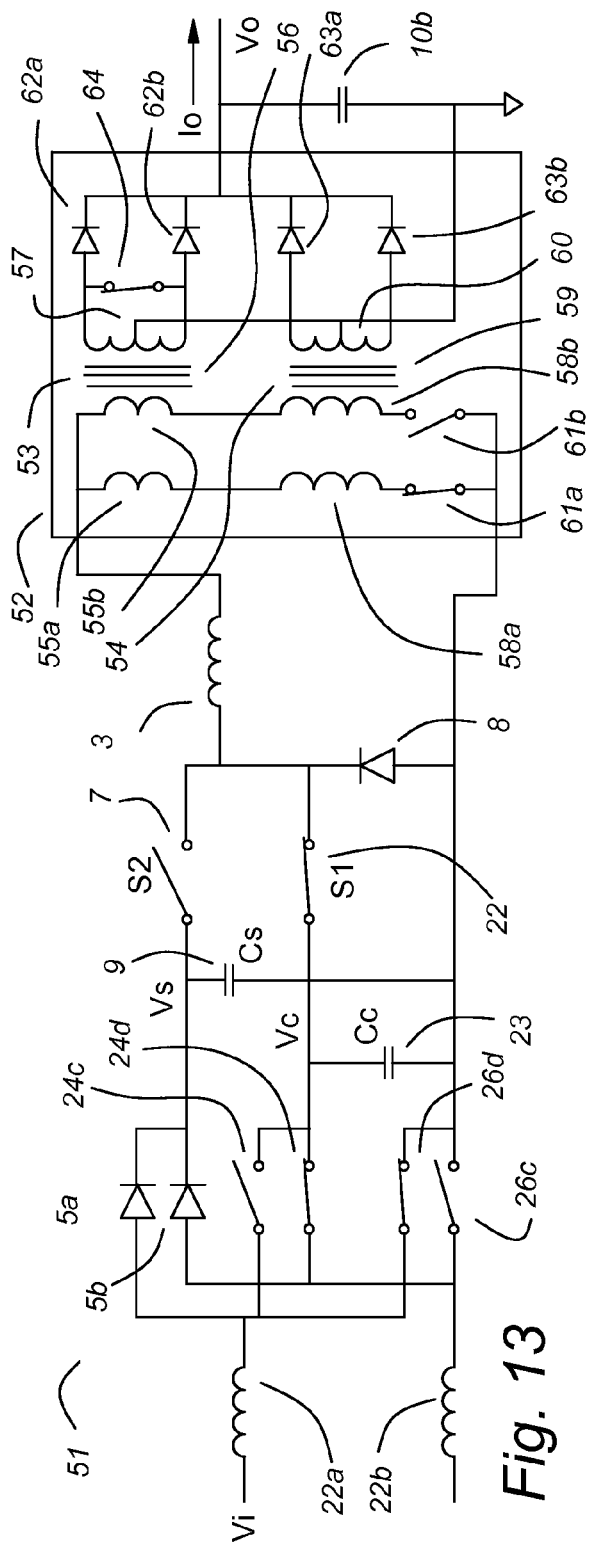

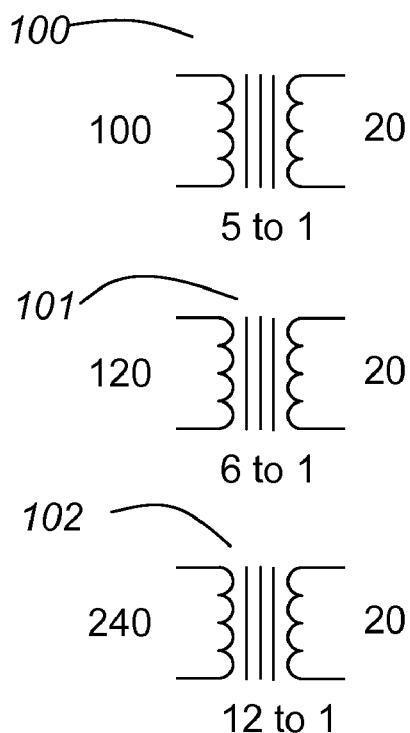
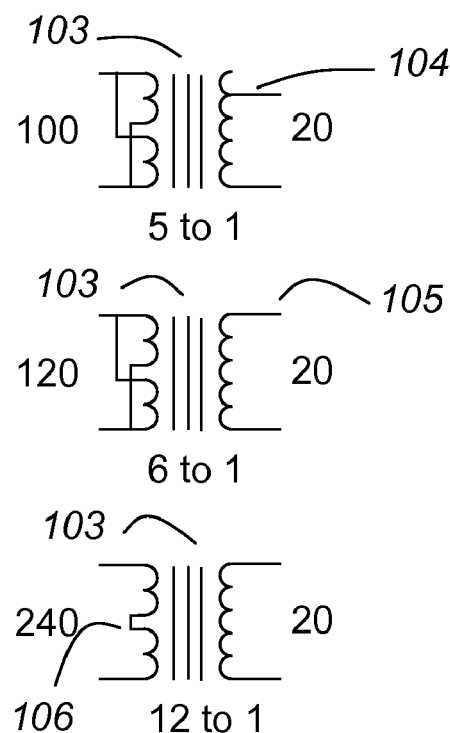
Fig. 14    Fig. 15
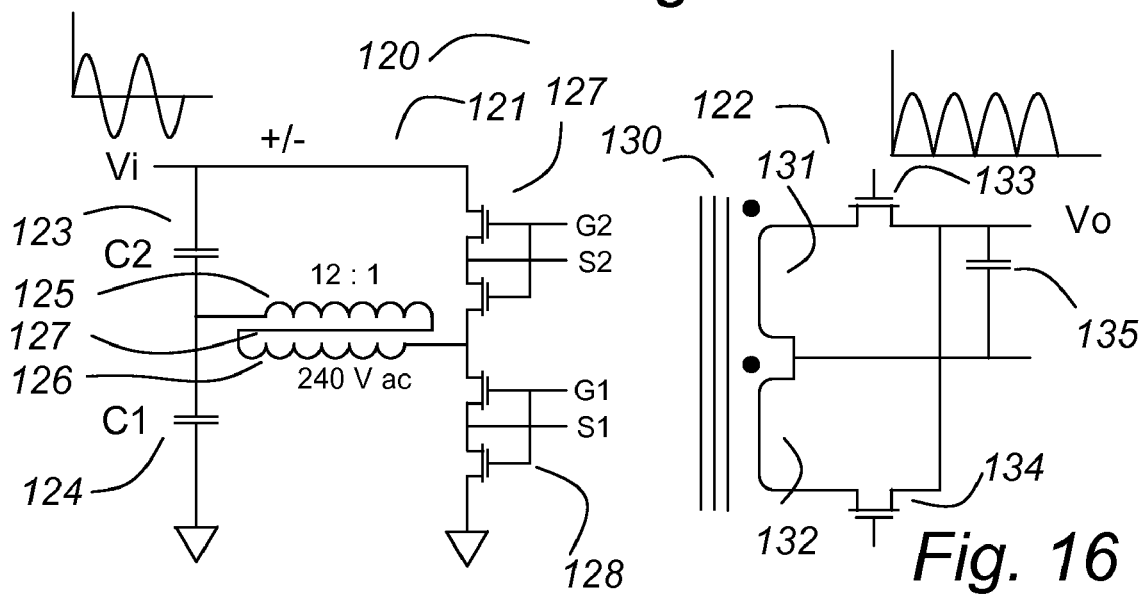
Fig. 16
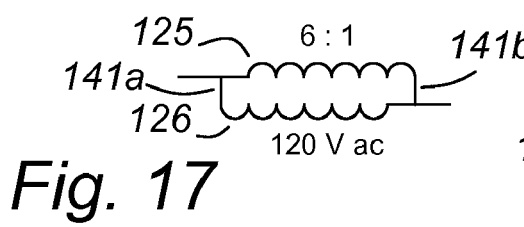
Fig. 17
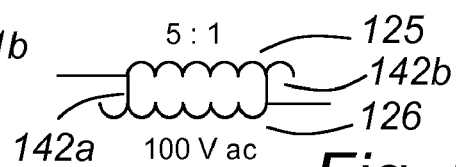
Fig. 18

POWER FACTOR CORRECTED SINGLE-PHASE AC-DC POWER CONVERTER USING NATURAL MODULATION

CROSS REFERENCE TO RELATED APPLICATIONS

This application is a continuation in part of the following patent application:

Ser. No. 11/767,516, filed Jun. 24, 2007, and entitled "Natural Modulation for Maximizing Efficiency in Power Converters"

This application claims priority to the following provisional patent applications:

Ser. No. 60/805,715, filed Jun. 23, 2006, and entitled "Using "Natural Voltage" to Maximize Efficiency in Power Converters."

Ser. No. 60/807,056, filed Jul. 11, 2006, and entitled Power Factor Corrected Single-Phase AC-DC Power Converter Using Natural Modulation."

Ser. No. 60/807,499, filed Jul. 16, 2006, and entitled "Power Factor Corrected Single-Phase AC-DC Buck Power Converter Ser. No. 60/820,993, filed Aug. 1, 2006, and entitled "Natural Modulation"

Ser. No. 60/866,613, filed Nov. 21, 2006, and entitled "Three-phase PFC Ac-Dc Converter having "100 Percent Duty Cycle," and Ser. No. 60/890,539, filed Feb. 19, 2007, and entitled "100% Duty-Cycle Buck-derived and 0% Duty-Cycle Boost-Derived PFC 3-Phase Ac-Dc Power Converters."

These patent applications are incorporated herein by reference.

The output stage for the power converters may be variable dc-dc transformer. Reference is made to U.S. patent application Ser. No. 11/423,957, filed Jun. 14, 2006 and entitled "Variable Transformer". This application is included herein by reference.

Also, reference is made to the following pfc (power factor correction) patents and patent applications:

U.S. Pat. No. 6,115,267, issued Sep. 5, 2000, and entitled "AC-DC Converter with No Input Rectifiers and Power Factor Correction."

U.S. Pat. No. 7,139,180, issued Nov. 21, 2006, entitled "Three Phase Buck Power Converters Having Input Current Control."

These patents are incorporated herein by reference.

BACKGROUND OF THE INVENTION

This application relates to power factor corrected (pfc) ac-dc power converters. The usual way of controlling power factor in an ac-dc power converter uses a boost converter input stage, boosting all of the input current to a high voltage storage capacitor. Then, all of the output current is taken from the high voltage storage capacitor through a buck converter output stage to the output. A transformer may be used to provide dielectric isolation and/or change the output voltage level.

Prior art pfc circuits are sluggish, difficult to control and inefficient.

SUMMARY OF THE INVENTION

The pfc ac-dc converter of this invention uses a modified boost converter input, but the usual switch to ground is directed instead to the output. Most of the input current goes directly to the output with only the current that needs to be stored to fill the "notch" going to the storage capacitor.

This invention uses a modified buck converter as the output stage. A third switch is added, and most of the output current flows through this switch. Only the current needed to fill the "notch" is taken from the storage capacitor.

Unlike the prior art pfc ac-dc converters, there is no measurement of the input current. The control uses "natural modulation". Natural modulation is defined as control by an algorithm, which is a function of the instantaneous input voltage and the storage capacitor voltage. If the relationships between the instantaneous input voltage and the voltage on the storage capacitor are satisfied, the input current is constrained to be correct (a sinusoidal shape, for power factor correction). The transient response is very fast for either line voltage changes or load changes.

For maximum efficiency, the pfc ac-dc converter has its control algorithm optimized to minimize losses. In this mode, the dc output voltage equals the input root-mean-square (rms) voltage, and the rms input current equals the dc output current. There is a small amount of ripple voltage on the output, proportional to the ripple voltage on the storage capacitor.

The control algorithm can be modified by a proportionality constant applied to the duty-cycle of the buck output stage. The proportionality constant may be controlled by feedback from the output voltage, to eliminate the ripple voltage and to correct for line and load regulation.

Alternatively, the output voltage can be post-regulated by any of a number of modulators, which may or may not provide isolation. The preferred output modulator is a variable dc-dc transformer.

A preferred operating mode is the "natural mode", for optimum efficiency, if the rms input voltage its near nominal value or lower, but it can transition to the regulated mode if the rms input voltage is too high. This provides maximum efficiency for the normal input voltage, which is where a power converter operates most of the time. The post regulation stage may then be a converter that can boost the output voltage if the input voltage is low. The preferred output stage is a variable dc-dc transformer, but a boost converter or a transformer configured as a Clarke converter are alternatives.

The natural voltage for the storage capacitor is a multiple of the rms input voltage, typically $(1+\sqrt{2})$ Vrms. This multiplier provides a very useful storage voltage of 290 volts with a 120 Vrms input voltage.

The circuit is most efficient when optimized for a particular voltage, but it has very good efficiency for a range above or below the optimum voltage. So, a converter that is optimized for 120 Vrms has satisfactory performance at 100 Vrms, and vice-versa. The control algorithm is independent of frequency, but the capacitance of the storage capacitor should be increased for lower frequency operation.

In another embodiment of the invention, the single pfc circuit if this invention is optimized for a low voltage full wave rectified input voltage, 20 V rms as an example, not a limitation. An input transformer then drops the ac input voltage and provides dielectric isolation so that the output of the pfc stage can be referenced to the load and used directly without further conditioning.

The rectified output of the transformer provides the source voltage for the pfc stage, and can be adapted for any of the "universal" inputs, 100 V ac for Japan, 120 V ac for the US and some other countries, and 240 V ac for most of the rest of the world. This requires transformers of 5 to 1, 6 to 1 or 12 to 1, if a single voltage input is acceptable. For a "universal" input, a transformer with taps can be used. For optimum efficiency, the circuit does not operate for any voltage 100 V ac to 240 V ac, but at the specific voltages. No power converter anywhere is likely to be required to operate at intermediate voltages, like 165 V ac. If the tap is incorrect, the circuit can be prevented from operating, and that will be true if the voltage is badly out of range.

BRIEF DESCRIPTION OF THE FIGURES

FIG. 1 shows a prior art pfc ac-dc converter having an boost input stage, a storage capacitor, and a buck output stage.

FIG. 2 shows the basic pfc ac-dc converter of this invention. No input current measurement is used.

FIG. 3 shows a full wave rectified input voltage wave-form. The cycle is divided into first and second regions, denoted 1 and 2, dividing the cycle approximately at the intercept of the input voltage instantaneous voltage and the rms voltage. In the natural mode, the output voltage Vo equals the rms input voltage.

FIG. 4 shows a modified prior art pfc ac-dc converter. Using separate input rectifiers for the boost to the storage capacitor allows the rectifiers to be "inside" the boost inductor, and one diode voltage drop is eliminated from the circuit path to the storage capacitor.

FIG. 5 shows a pfc ac-dc converter of this invention having synchronous input rectifiers for the boost switching function and in the return. By using an extra switch, two rectifiers are eliminated, and the forward drop of the input rectifiers is avoided for that branch of the circuit. No input current measurement is used.

FIG. 6 is a graph of the input voltage and current as well as the storage capacitor voltage and the output voltage when the circuit is operated with "natural modulation". This graph was generated by SPICE simulation.

FIG. 12 shows an embodiment of the invention with the boost rectifiers as rectifiers and the other input rectifiers as synchronous switches. A dc-dc transformer may provide isolation of the output voltage as well as voltage level shifting. It is contemplated that the dc-dc transformer may be operated as a Clarke converter, providing some boost if the rms input voltage is low.

FIG. 13 shows a pfc ac-dc converter of this invention with a two section variable dc-dc transformer as a post regulator. As an example, one section of the variable dc-dc transformer may have a ratio of 2 to 1 and the other section may have a ratio of 10 to 1, so that with the primaries in series and the secondaries in parallel, the turns ratio is 12 to one. If the secondary of the section with the 2 to 1 ratio is short-circuited, the effective turns ratio of the transformer is then 10 to 1. The shorting switch may be modulated to provide any effective turns ratio between 10 to 1 and 12 to 1, giving an adjustment range of 11±1.

FIG. 14 shows three fixed ratio transformers that are suitable for adapting a fixed voltage pfc output stage to either of the common voltages used world wide.

FIG. 15 shows three connections for a tapped transformer that are suitable for adapting a fixed voltage pfc output stage to either of the common voltages used world wide.

FIG. 16 shows a transformer coupled half-bridge ac input having a full wave rectified output voltage. The primary of the transformer is shown connected for 240 V ac operation.

FIG. 17 shows an alternate connection for the transformer of FIG. 16, for 120 V ac operation.

FIG. 18 shows an alternate connection for the transformer of FIG. 16, for 100 V ac operation.

DETAILED DESCRIPTION

Figure 7:
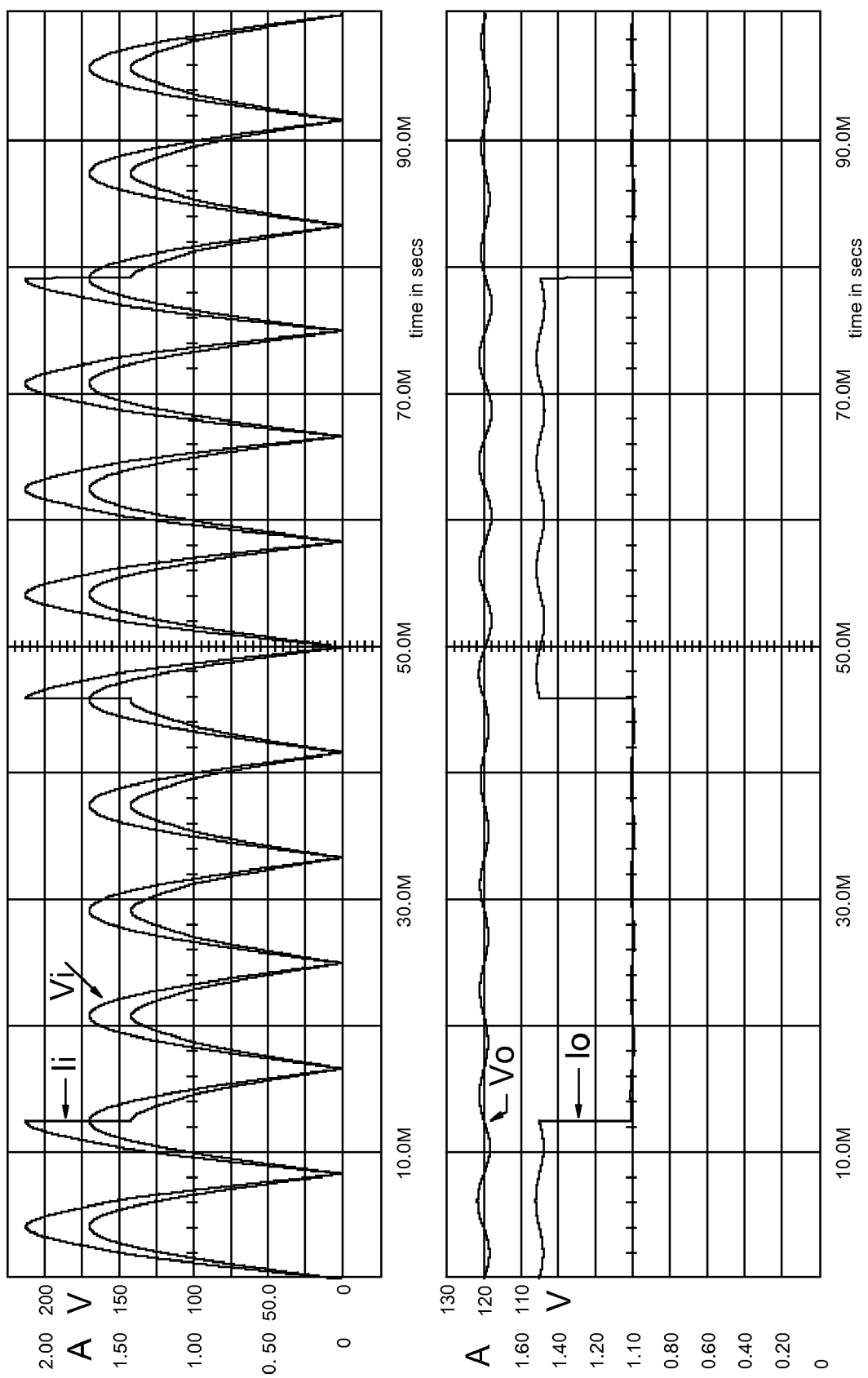
FIG. 7 shows a graph of a SPICE simulation showing the response to changes of load current Io. Note that there is no appreciable delay in the response of the input current Ii to changes in the load. The SPICE model is ideal, so there is no change in the output voltage Vo with load change. A practical circuit has some load regulation.

FIG. 1 shows a prior art power factor corrected (pfc) ac-dc converter 1. An input voltage Vi is a full wave rectified ac voltage, shown graphically by a graph 11. The input stage has a boost inductor 2 to smooth the input current Ii and to provide stored energy for the boost function. A switch 4 connects the boost inductor 2 to the return. When the switch 4 opens, current flows from the boost inductor 2 through a boost rectifier 5 to a storage capacitor 9. The output stage has a buck inductor 3 to smooth an output current and to provide stored energy for the buck function. When a switch 7 closes, current flows from the storage capacitor 9 to the buck inductor 3. When the switch 7 opens, the current flows through a catch rectifier 8. An output capacitor 10 further smoothes a dc output voltage Vo, shown graphically by a graph 12.

The prior art pfc ac-dc converter requires an input current measurement 6 to control the boost switch 4. The storage capacitor 9 typically is at a very high voltage, so the buck switch 7 tends to have a low duty-cycle, which is inefficient.

In the figures, like numbered items are the same. Items with the same number but with a different suffix (example, the rectifier 5 of FIG. 1 and the rectifiers 5a and 5b of FIG. 4) are functionally related but with some difference. In most instances, the relationship is that they perform the same circuit function. Many of the drawings are simplified schematics, showing only the parts necessary to explain the points of novelty sufficiently so that one skilled in the art of power converters can use the invention without undue experimentation. Many parts necessary for practical power converters are not shown, such as input filters, feedback amplifiers and controls, snubbers, MOSFET switches, rectifiers, monitoring and error detection circuits, voltage references and so forth, as illustrations, not limitations. One skilled in the art of power converters would know how to design and use these parts to make a practical power converter.

FIG. 2 shows a pfc ac-dc converter 21, which is a modification of the pfc ac-dc converter 1 of FIG. 1. The input voltage Vi is a full wave rectified ac voltage. The input stage has the boost inductor 2 to smooth the input current Ii and to provide stored energy for the boost function. However, the switch 4 connects the boost inductor 2 to the output buck inductor 3 through a switch 22 instead of to the return. When the switch 4 opens, current flows from the boost inductor 2 through the boost rectifier 5 to the storage capacitor 9. The switch 4 operates only when the instantaneous input voltage Vi is above its rms value. During the rest of the cycle, it remains closed.

When the input voltage Vi is above its rms value, the switch 22 remains closed. When the input voltage Vi falls below its rms value, the switch 22 begins to open periodically to control the input current Ii. The duty-cycle of the switch 22 is determined as $|\sin X|$, where X is the phase angle of the ac input voltage.

Periodically, during the time that the switch 22 is open, the switch 7 closes so that current can flow from the storage capacitor 9 to the buck inductor 3. When both the switch 22 and the switch 7 are open, current flows through the catch rectifier 8. The output capacitor 10 further smoothes the dc output voltage Vo, shown graphically by the graph 12.

Note that the current measurement 6 of FIG. 1 is not used with the pfc ac-dc converter 21 of FIG. 2.

FIG. 3 shows the waveform of the input voltage Vi and its relationship to the output voltage Vo. When operated in the "natural mode", the output voltage Vo equals the input voltage root mean square (rms) value, at steady state conditions. Dashed vertical lines correspond with the intersection of the rms input voltage with the instantaneous input voltage, and separate the cycle into regions 1 and 2. In region 1, the instantaneous input voltage is lower than the rms voltage value, and in region 2, it is higher. The pfc ac-dc converter 21 of FIG. 2 operates differently in regions 1 and 2.

FIG. 4 shows a pfc ac-dc converter 31, which is a modification of the pfc ac-dc converter 1 of FIG. 1. The input voltage Vi is now the actual ac voltage input, not the rectified voltage as in FIG. 1, because the full wave rectification function is incorporated into the circuit. This allows the rectifiers to be "inside" the inductor. The boost inductor is now a split boost inductor 22a and 22b. Because this is a series circuit, it makes no difference to the operation of the circuit if the boost inductor is divided, but this configuration may improve conducted electromagnetic interference (emi) back into the input.

When the switch 4 is closed, the current from the boost inductors 22a and 22b is still shorted, but not directly, as in FIG. 1. Rather, they are shorted through the rectifiers 24a and 24b, whichever one is forward biased. When the switch 4 is open, the current from the boost inductors 22a and 22b still flows to the storage capacitor 9, but now it is through one or the other of the boost rectifiers 5a or 5b. The return rectifiers 26a and 26b function as any low side rectifiers in a full wave bridge.

FIG. 5 shows a pfc ac-dc converter 33, which is a modification of the pfc ac-dc converter 21 of FIG. 2. The input circuit has modification similar to those shown in FIG. 4, but with some differences. The switch 4 of FIG. 2 is now replaced in FIG. 5 with two switches 24c and 24d. Collectively, they provide the same function as the switch 4 of FIG. 2, but they must be operated with the correct phasing. Further, they must be ac switches, that is, they must block current of either polarity when turned off.

As in FIG. 4, the boost current flows to the storage capacitor 9 through the boost rectifiers 5a and 5b, whichever one is forward biased. The rationale is that the rectifiers 5a and 5b do not need to be active switches, as they are reversed biased whenever one of the switches 24c or 24d is turned on. Further, if they were synchronous rectifiers, their control and drive circuitry presents more of a challenge. It is contemplated that they may be silicon carbide rectifiers, as they are well suited to boost converter applications.

The return rectifiers, 26c and 26d are now synchronous rectifiers, as is the catch rectifier 8a. This arrangement eliminates the full bridge rectifier at the input and may reduce the conduction losses. Synchronous rectifiers may have a lower forward voltage drop, but more important, they provide an "on-off" function at the input. This can be useful for preventing turn on if the input voltage conditions are wrong, and they can control the timing of the application of power, so that the inrush current is consistent and is minimized.

Theory of operation: Returning to FIG. 2, with reference to FIG. 3, the boost input stage does not operate in region 1, when the instantaneous input voltage is lower than the rms voltage Vrms. The switch 4 is on continuously. While the switch 4 will have some conduction losses, there are no switching losses. In region 2, when the instantaneous input voltage exceeds the rms voltage, the switch 4 begins to open periodically, diverting current that is in excess of the required output current Io to the storage capacitor 9. Just after the intercept, this boost current is low but it reaches a peak value of around 40 percent of the output current.

During region 2, when the input voltage is above the rms voltage, the switch 22 does not operate and remains closed. It has some conduction losses, but no switching losses. The duty cycle D3 of the switch 4 determines the output current Io as D3 Ii, and the current to the storage capacitor 9 is (1−D3) Ii.

When the input voltage falls below the rms voltage, the switch 22 begins to operate, and its duty-cycle defines the input current Ii as a function of the output current Io. The input current Ii is D1 times the current through a buck inductor 3. The current through the buck inductor 3 approximately equals the output current Io, and equals it exactly, when averaged.

During the "notch," defined as region 1 in FIG. 3, the input voltage is insufficient to sustain the output current Io through the inductor 3, so periodically a switch 7 is closed to the storage capacitor 9. During this period, the switch 22 must be open, and current flows from the storage capacitor 9 to the buck inductor 3, recharging the current therein. At times in the switching cycle, both the switch 22 and the switch 7 are open, and the current through the inductor 3 will flow through the catch rectifier 8. An output capacitor 10 smoothes the output voltage Vo in the usual manner of a buck converter.

A small coupling capacitor 23 allows the instantaneous currents through the switch 4 and the switch 22 to differ, though they must be equal on average. When the instantaneous input voltage is below the rms voltage, the switch 4 remains closed, so the voltage Vc on the coupling capacitor 23 equals the input voltage Vi. Accordingly, D1 Vi plus D2 Vs equals Vo, where D1 and D2 are the duty-cycles of the switch 4 and the switch 7, respectively.

The theory of operation is explained in terms of the voltages Vi, Vs and Vo and the currents Ii and Io with reference to FIG. 2. From above, D1 is the time that the switch S1 (22) is closed, D2 is the time that the switch S2 (7) is closed and D3 is the time that the switch S3 (4) is closed. For the theory of operation, the alphanumeric reference designators are used so that the association of the switch with its duty cycle (S1 with D1, etc.) is more apparent.

Vi is the instantaneous input voltage, Vo is the dc output voltage, Ii is the instantaneous input current, and Io is the dc output voltage. When operated with "natural modulation", the output voltage Vo equals the rms input voltage Vrms, and Io equals the rms input current Irms.

Looking first at region 2, with reference to FIG. 2, when the input voltage Vi is above the rms voltage Vrms, the switch S1 is closed continuously, so D1=1 and D2=0.

$$Io = D3 * Ii \qquad [1]$$

$$D3 = \frac{Io}{Ii} = \frac{Vo}{Vi} = \frac{Irms}{Ii} = \frac{Vrms}{Vi} \qquad [2]$$

The circuit does not use any input current measurement, but the ratio of the rms voltage to the sinusoidal input voltage is the same as the ratio of the rms input current to the sinusoidal input current. The voltages Vi and Vo are more easily measured.

With natural modulation, the output voltage Vo equals the rms input voltage, so $$D3 = \frac{Vo}{Vo * \sqrt{2} * |SinX|} \qquad [3]$$

$$D3 = \frac{1}{\sqrt{2} * |SinX|} \qquad [4]$$

The equation [2] above solves D3 in terms of current. D3 may also be solved in terms of voltage. Remembering that D1 is 1 for operation in region 1, Vc equals Vo during operation in region 2, so $$Vi = D3 * Vo + (1-D3)) * Vs \qquad [5]$$

The output voltage Vo equals the rms input voltage, so $$Vo * \sqrt{2} * |Sin X| = D3 * Vo + (1-D3) * Vs \qquad [6]$$

At the peak voltage, |Sin X|=1, so, from [4], $$D3_P = \frac{1}{\sqrt{2}} \qquad [7]$$

Substituting, and solving for Vs, $$Vs = Vo * (1 + \sqrt{2}) \qquad [8]$$

Rigorously, the voltage Vs from [8] is correct only for the instant that the input voltage is at its peak (X=90 degrees and x=270 degrees), but test solutions and SPICE simulations show that at other phase angles, the error is small, very acceptable as an approximation.

It is usual to use the input voltage Vi as a sine reference in pfc circuits. To extract the function |sin X|, the peak voltage must be divided out:

$$Vi = Vo * \sqrt{2} * |Sin X| \qquad [9]$$

$$|SinX| = \frac{Vi}{Vo * \sqrt{2}} \qquad [10]$$

Substituting [10] into [4], $$D3 = \frac{Vo}{Vi} \qquad [11]$$

When Vi is at its rms value, D3 equals 1, and it is constrained to be 1 for any lower input voltage Vi. When Vi is above its rms value, D3 reduces until at the peak voltage, about 40 percent of the input current is diverted to the storage capacitor, but about 60 percent still flows straight through to the output.

Looking now at region 1, with reference to FIG. 2, when the input voltage Vi is below the rms voltage, S3 is closed continuously, so D3=1. D1 defines the input current as a function of the output current. The ideal wave form for the input current is sinusoidal, so $$D1 = |Sin X|, \qquad [12]$$

where X is the phase angle of the input voltage waveform. Substituting from [10], $$D1 = \frac{Vi}{Vo * \sqrt{2}} \qquad [13]$$

D2 is defined in terms of the voltage Vs on the storage capacitor, but is influenced by D1.

$$D1 Vi + D2 Vs = Vo. \qquad [14]$$

Substituting and rearranging terms, $$D2 = \frac{Vo - D1 * Vi}{Vs} \qquad [15]$$

This would be a horrible equation to solve and model, but fortunately, it is not necessary. All that is necessary is to constrain D2 such that D1 has priority and always modulates strictly in accordance with [13]. If D2 is then allowed to regulate the output voltage Vo as a function of the voltage Vs on the storage capacitor, it will be constrained to the correct value, including the influence of D1. From [8], that voltage Vo is $$Vo = \frac{Vs}{1 + \sqrt{2}} \qquad [16]$$

In the above equations, the output voltage Vo is the dependant variable that is produced when the circuit is operating properly. In fact, it is a stand-in for the rms input voltage, Vrms, and, ideally, Vrms would be known. Rms voltage is very difficult to measure, however, so this invention teaches that the voltage on the storage capacitor can be substituted, per [8], as in [16]. The measured value of Vs is used in the synthesis of the duty-cycle D3. It is divided in a resistor divider or other scaling device to produce a reference voltage representing the desired Vo.

This begs the question of what happens if the instantaneous value of Vs is wrong. That is always the case to some small degree, and in some instances, the error can be substantial, such as at start up or following a transient. The answer is that if the duty-cycles are implemented using the measured Vs, and the Vs is wrong, the current flow in the various elements of the circuit is such that the correct Vs is restored.

The reason for this is that both charge and energy must be conserved, and the equations defining them must reconcile. The equations can be solved simultaneously to find the correct value for the storage capacitor Vs. The current, amperes, is the flow of charge in coulombs per second. The power, watts, is the flow of energy in joules per second. The derivation above started by defining the necessary duty-cycle D3 to make the current flow correct. That same duty-cycle controls the energy flow, and the correct energy flow depends upon the value of the voltage Vs on the storage capacitor. By using the duty-cycle D3 that is required for correct current flow in the equations to derive the voltage Vs, the unique voltage Vs on the storage capacitor that provides the correct energy flow is found.

In the circuit, if the voltage Vs is too low, more current will flow into the storage capacitor and less will flow out until the balance is restored. By solving for Vs using the voltage at peak, the sine functions became equal to 1, so the math is easy. At other phase angles, the theoretical value of Vs is slightly different, resulting in a very slightly distorted current waveform, and the voltage Vs settles out just under the predicted value.

Because Vs is scaled as a function of the rms input voltage value, if there is a transient increase in the input voltage, the voltage on the storage capacitor will tend to follow. It is a slow increase however, so the transient over-voltage has to persist for several cycles to be a problem. If the input voltage goes high and remains high, so that the components of the circuit might be overstressed, the solution is to put the switch S3 of FIG. 2 in the open position. This will interrupt the flow of current from the input to the output, but the output voltage is still provided through the pulse-width-modulation of S2 as long as there is sufficient charge on the storage capacitor 9. With S3 in the open position, the storage capacitor 9 will peak charge through the rectifier 5. Particularly in an over-voltage situation, this is very likely sufficient to maintain the output voltage and current. Power factor correction is lost, but the circuit is protected and continues to provide the correct output.

The above analysis teaches the pfc ac-dc converter operating in the natural mode, for optimum efficiency. It is noteworthy that for significant portions of the ac cycle, one or another of the switches is not switched, but is either on continuously or off continuously. The switching losses are thus significantly reduced. An alternative mode of operation provides a precisely regulated output voltage. Even when a pfc ac-dc converter operates normally in the natural mode, it can transition to a regulated mode if the input voltage is too high, and thus control the upper limit of the output voltage during over-voltage transients.

This can be seen by inspection. Consider, in FIG. 2, that the output voltage Vo is determined by the duty-cycles D1 and D2, respectively, of the switches S1 and S2, as in [14]. If both duty-cycles D1 and D2 are reduced in the same proportion, the output voltage is reduced in the same proportion. [14] can be rewritten as:

$$Vo' = K*D1\,Vi + K*D2\,Vs = K*Vo. \qquad [17]$$

However, D1 is constrained by [13] when the input voltage is below Vrms. That is not a problem. Just as before, as long as D1 has priority over D2, a voltage feedback control of D2 will account for the voltage contribution of D1. Accordingly, for region 1 of FIG. 3, when the input voltage Vi is below Vrms, D2 is generated by feedback from the output such that $$Vo = K*\frac{Vs}{1+\sqrt{2}} \qquad [18]$$

The factor K could be fixed, to define a reduced voltage natural mode, but it is contemplated that K varies as a feedback function to correct the output voltage for line and load regulation or to limit an over-voltage condition. The implication of applying the factor K is that the duty-cycle of the switches S1 cannot be 1 during peak voltage, region 2, with reference to FIGS. 2 and 3. Accordingly, during region 2, the switch S1 is operated by feedback to control the output voltage Vo, still in accordance with [18].

FIG. 6 shows graphs of a SPICE simulation based upon the circuit of FIG. 2. The model is an average state model, and shows the theoretical circuit input and output voltages and currents with ideal components. The model is operating in the natural mode. There is no feedback or feedforward. There is no measurement of the input current Ii, in that it is not a factor in any algorithm, and it is measured only to display in the graph. The input current wave form Ii tracks the input voltage Vi entirely by virtue of the natural modulation algorithm. The input current Ii has a very satisfactory waveform for power factor correction (pfc), with only slight distortion above the rms voltage level and none below it.

The dc output voltage Vo equals the rms input voltage. It can be seen that the voltage Vs (the storage capacitor voltage) is higher than the output voltage by approximately (1+$\sqrt{2}$)=2.414, and it has a slight ripple voltage, as would be expected. The same ripple voltage, proportionately, can be seen in the output voltage Vo.

The slight departure of the current waveform Ii from the ideal is a result of the algorithm not being perfect at every point, but it is very good.

FIG. 7 shows the load regulation of the SPICE model based upon the circuit of FIG. 2. Note that the input current Ii responds with no appreciable delay to the change in the output current Io, and the input current waveform remains nearly ideal. The input voltage Vi and the output voltage Vo do not vary, as the components of the SPICE model are ideal. A practical circuit would have some load regulation.

Figure 8:
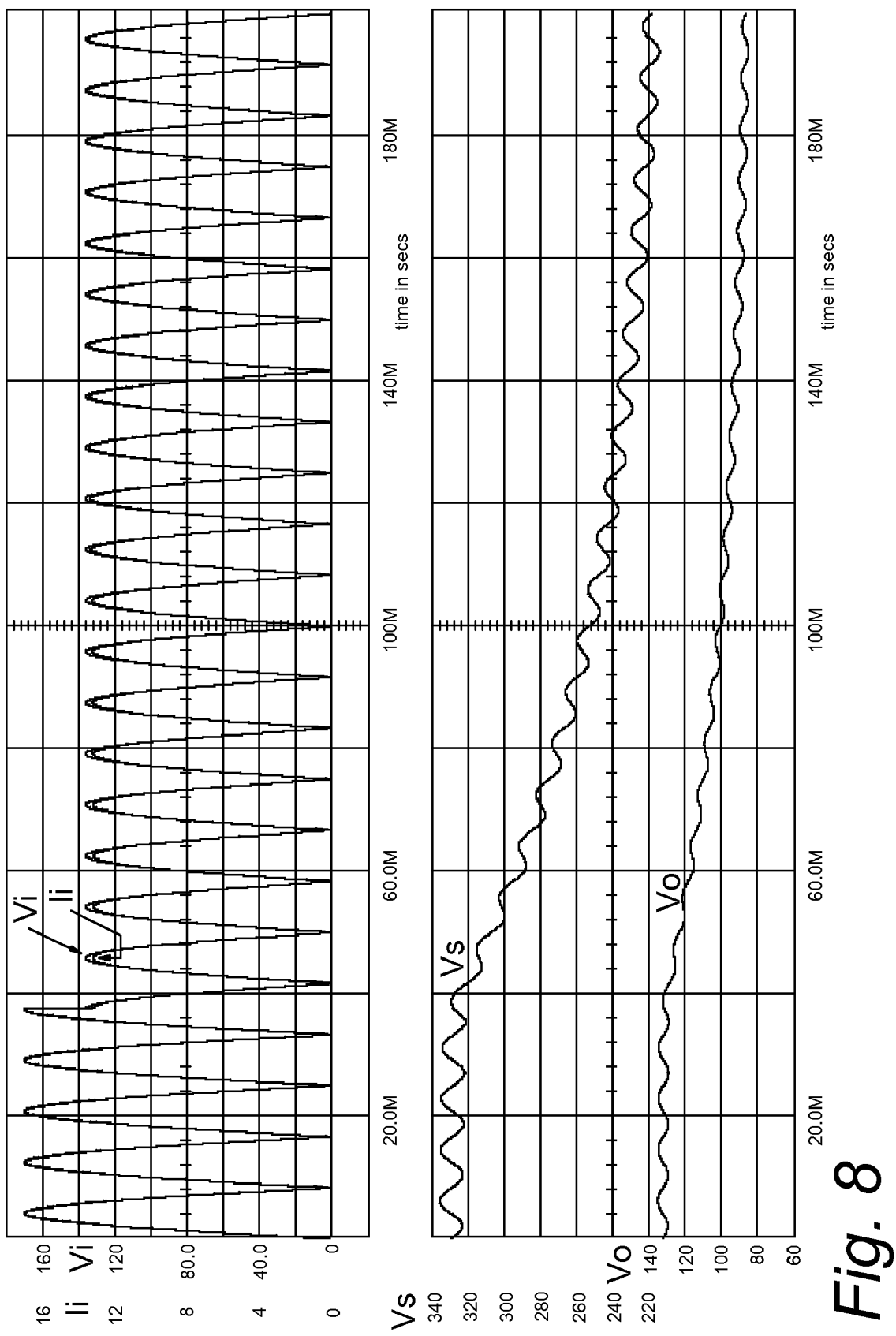
FIG. 8 shows a graph of a SPICE simulation showing the response to changes of the input voltage Vi. Note that there is no delay in the response of the input current Ii, but the output voltage Vo responds much more slowly, due to the filtering effect of the energy stored in the storage capacitor.

FIG. 8 shows the response to a step change in the input voltage Vi. Note that the input current Ii responds with no appreciable delay and remains nearly ideal. The voltage on the storage capacitor Vs and the output voltage Vo change relatively slowly due to the stored energy on the storage capacitor. In time, the output voltage Vo changes to equal the new rms input voltage Vrms, but it can be seen that the output voltage Vo is relatively immune to short term input voltage transients.

Figure 9:
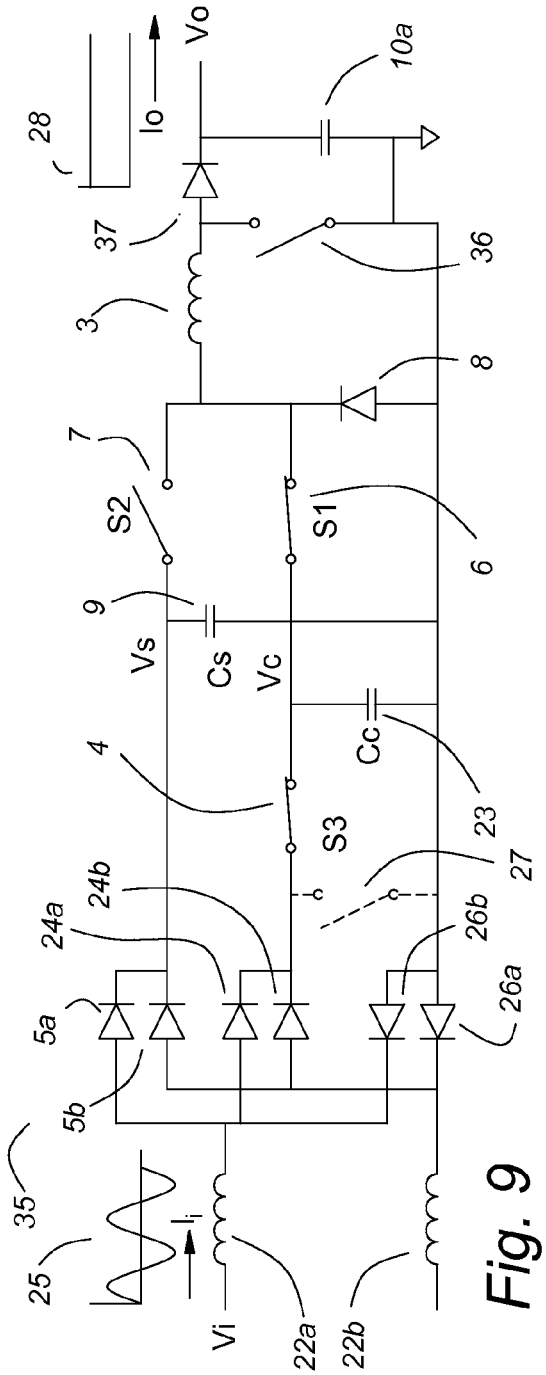
FIG. 9 shows an embodiment of the invention with input rectifiers and a boost converter post regulator. Using separate input rectifiers for the boost to the storage capacitor allows the rectifiers to be "inside" the boost inductor, and one diode voltage drop is eliminated from the circuit path to the storage capacitor.

FIG. 9 shows a pfc ac-dc converter 35 that is the pfc ac-dc converter 33 of FIG. 5, with some modifications. The output now has a boost converter post regulator, an output boost switch 36 and an output boost rectifier 77. The voltage could be boosted with an optional boost switch 27, shown in phantom, but by placing the boost switch 36 on the output of the pfc ac-dc converter 35, the output voltage can be boosted as the storage capacitor 9 bleeds down following a loss of input power for improved hold up time.

The output boost converter provides neither isolation nor significant voltage shifting. The output boost converter may be followed by a dc-dc transformer to provide those functions.

Figure 10:
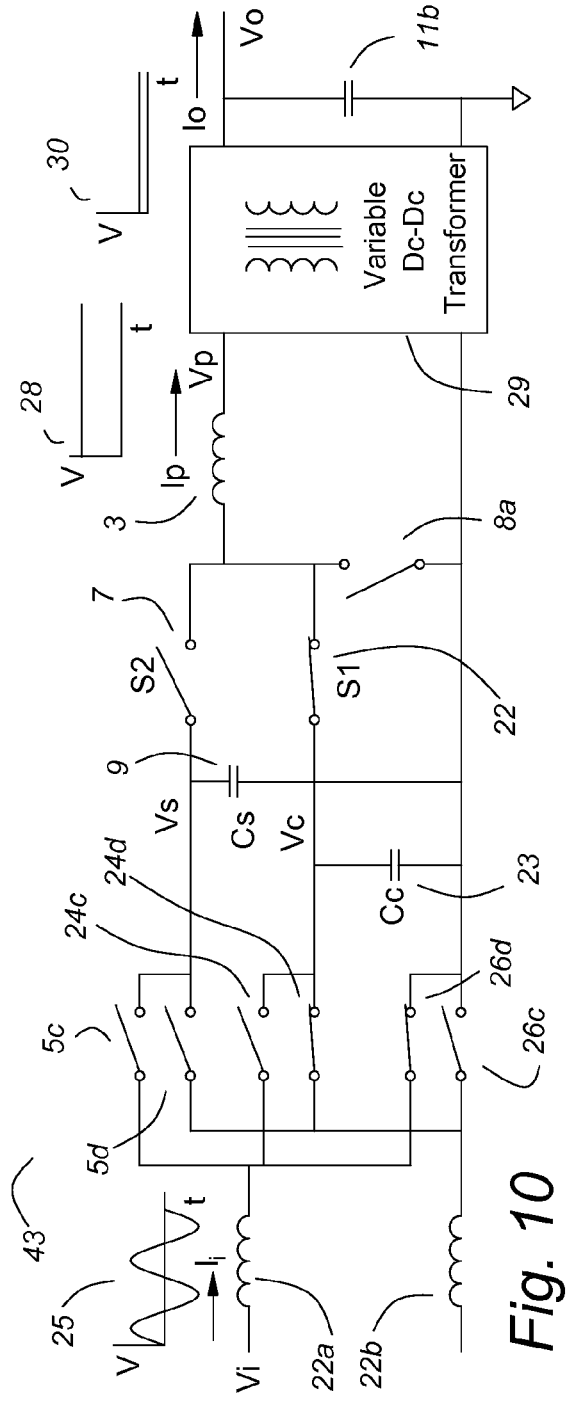
FIG. 10 shows an embodiment of the invention with synchronous input rectifiers, and a variable ratio dc-dc transformer to provide voltage level change and dielectric isolation. By using synchronous input rectifiers, some of the switch functions may be done by the synchronous rectifiers. The diode voltage drop of the input rectifier is eliminated, though there is an extra series switch in the return.

FIG. 10 shows a pfc ac-dc converter 43 that is a modification of the pfc ac-dc converter 33 of FIG. 5. The rectifiers 5c, 5d, 24c, 24d, 26c and 26d are now synchronous rectifiers as is the catch rectifier 8a. This has some advantages, as synchronous rectifiers usually have a lower voltage drop, for reduced losses. Another advantage is that it allows reverse current flow. With appropriate adjustments to the control algorithms, the pfc ac-dc converters of this invention are reciprocal. That is, a pfc ac-dc converter can be configured as a dc-ac converter with a sinusoidal output.

In this specification and the claims, recitation of a circuit designed to conduct current in one direction includes its reciprocal, it being understood that the modifications to permit reversed current flow (or current flow in both directions) would be well understood by one skilled in the art of power converters.

FIG. 10 also shows a variable dc-dc transformer 29 on the output of the pfc ac-dc converter 43, to provide output voltage regulation as well as a shifted output voltage. A dc-dc transformer is defined as a high frequency transformer circuit with a 100 percent duty-cycle primary excitation and a full-wave rectified output. A dc-dc transformer may be used on the output to provide voltage level shifting alone. Alternatively, being driven by the buck inductor 3, it may be operated as a Clarke converter to provide a boost function.

In the present example, it is contemplated to use the variable dc-dc transformer 29. The effective turns ratio of a variable dc-dc transformer may be changed by electronic switching. The operation of a variable dc-dc transformer is explained in detail in Ser. No. 10/423,957, which is incorporated herein by reference. For the purposes of this discussion, it suffices to note that the ratio of the variable dc-dc transformer 29 may be modulated by feedback control to regulate the output voltage. As the inter-stage voltage Vp from the buck stage of the pfc ac-dc converter 43 decreases, for an under-voltage condition (brown-out) or following the loss of the input voltage Vi, the effective turns ration is reduced to compensate.

Unfortunately, as the inter-stage voltage Vp decreases, the inter-stage current Ip must increase in proportion, to maintain a constant output voltage and current, and the converter may have to be shut down if the current increase becomes excessive or remains high for too long. It is helpful if there is load shedding during brown-out or following loss of the input voltage Vi.

Figure 11:
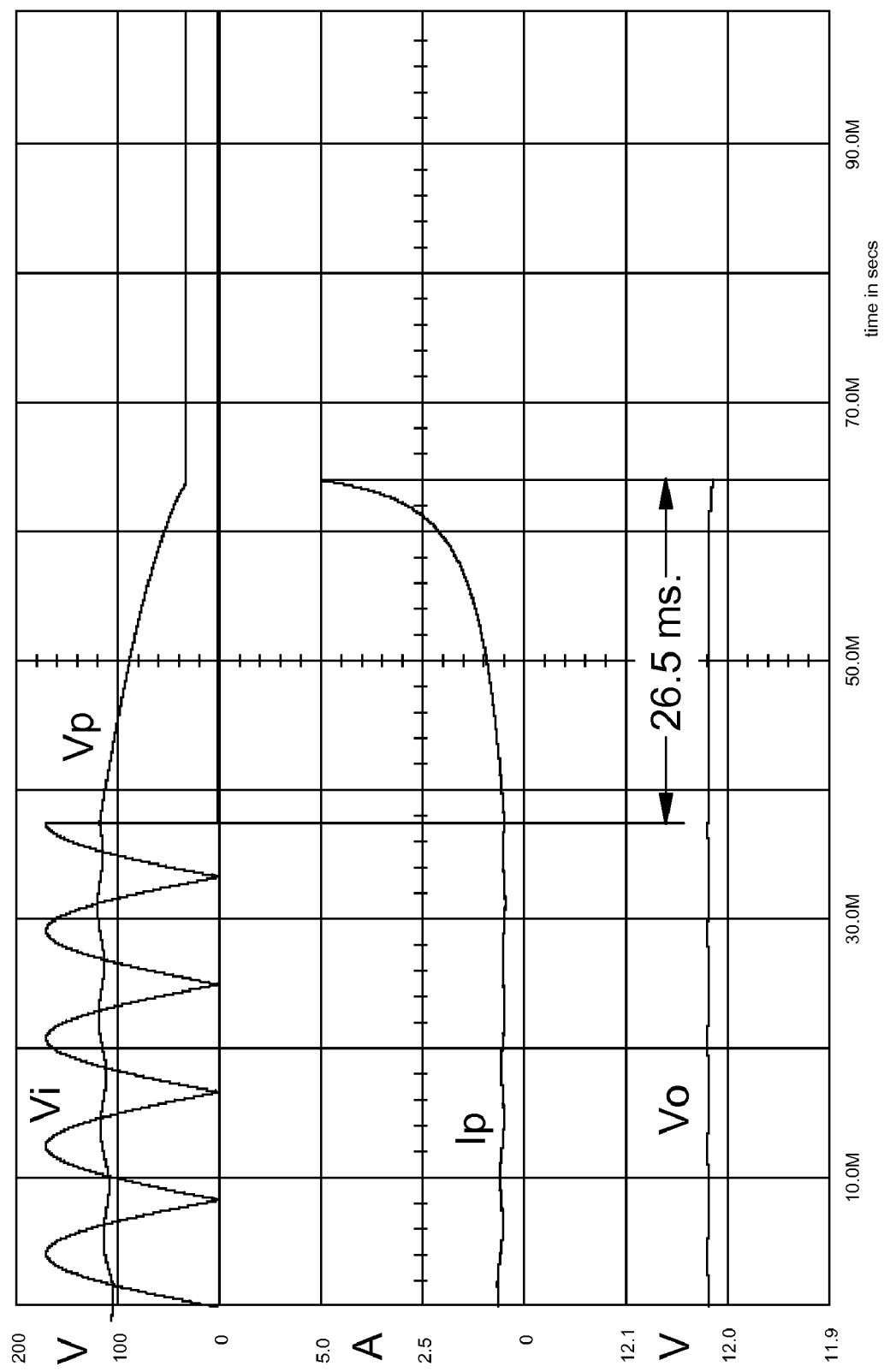
FIG. 11 shows a graph of a SPICE simulation showing the response to loss of the input voltage Vi. This SPICE model includes a post regulator, such as the one shown in FIG. 10.

FIG. 11 shows a graph of a SPICE simulation of a pfc ac-dc converter SPICE model to which an output modulator is added, to simulate the behavior of a post regulator, such as a variable dc-dc transformer. The output voltage Vo is held constant as the charge on the storage capacitor (not shown) drains down following the loss of the input voltage Vi, and the inter-stage voltage Vp tracks the voltage on the storage capacitor linearly. As the inter-stage voltage Vp drops, the inter-stage current Ip into the output modulator increases proportionately, increasing very rapidly as the inter-stage voltage Vp gets very low. The model simulates a cut-off at a set limit. About 90 percent of the stored energy is recovered.

FIG. 12 shows a pfc ac-dc converter 45, which is a modification of the pfc ac-dc converter 33 of FIG. 5. The low side synchronous rectifiers 23c and 23d are actually polarity switches. Their function can be performed using rectifiers with no switching function other than turning off when reversed biased, but synchronous rectifiers are contemplated for several benefits. One is that they may have a lower forward drop. Another is that they can be kept off initially at start up. The optimum time in the cycle can be chosen to start the circuit (to control inrush) or they can be left off if the input conditions are wrong.

If a surge suppressor 39 is included, the synchronous rectifiers 23c and 23d can be opened in response to adverse circuit conditions. The surge suppressor 39 may be a MOV, back to back zener diodes, a spark gap or the like, as examples, not limitations.

FIG. 12 also shows a dc-dc transformer 32 on the output as a post regulator. The dc-dc transformer 32 has a transformer core 33 and primary windings 34a and 34b. Primary switches 36a and 36b switch alternately to provide a primary excitation. A secondary winding 38 is full wave rectified by rectifiers 37a and 37b. An output capacitor 10b completes the circuit.

It is contemplated that the dc-dc transformer 32 may be operated as a Clarke converter. A Clarke converter is well known to one skilled in the art of power converters. Because there is no capacitor on its input, it is current driven by the current in the buck inductor 3. Accordingly, one or the other of the primary switches 36a and 36b must always be on. If both of the primary switches 36a and 36b are on at the same time, the mmf in the transformer is cancelled and the primary is an effective short-circuit. This causes the current in the buck inductor 3 to increase, just as in a boost converter, and this may be used to provide an increased output voltage.

For optimum efficiency, the dc-dc transformer may operate at its maximum duty-cycle for normal conditions, yet it can operate with a reduced duty-cycle to provide a boosted regulated output voltage Vo during under-voltage conditions or for a time following loss of the input power.

FIG. 13 shows a pfc ac-dc converter 51, which is the pfc ac-dc converter 33 of FIG. 5 with a variable dc-dc transformer 52 on its output. The variable dc-dc transformer has a number of transformer sections with their primary windings in series. In the example, there are two transformer sections 53 and 54, the minimum number, on two magnetic cores 56 and 59. The respective primary windings 55a, 55b, 58a and 58c are connected in series with common switches 61a and 61b providing 100 percent duty-cycle primary switching. Two secondary windings 57 and 60 are rectified by rectifiers 62a, 62b, 63a and 63b. All of the rectifier outputs are connected in parallel to provide the output voltage Vo to an output capacitor 10b.

A variable dc-dc transformer may have a large number of sections, and the maximum equivalent turns ratio is determined as the product of the number of sections times the number of turns, as in a matrix transformer. The effective turns ratio of the variable dc-dc transformer may be modified by electronic switching. In the example, a shorting switch 64 may be turned on to short-circuit the secondary winding 57. The rectifiers 62a and 62b are then reversed biased and thus are off, so there is no output current from that section. Further, the short-circuit is reflected to the primary windings and there is no voltage reflected to the primary circuit for that section. It is as if the section were not there, and it is said to have been "effectively removed" from the circuit.

In the example, the transformer ratio is changed from 2 to 1 to 1 to 1, if each of the transformer sections 53 and 54 has single turn windings) when the shorting switch 64 is closed. It is contemplated, however, that the second transformer section 54 may have a higher turns ratio and the first transformer section 53b may have a lower ratio. When both are "in" the circuit, the effective turns ratio is the sum of the individual turns ratios. As an example, not a limitation, the first transformer section 53 may have a 2 to 1 ratio, and the second transformer section 54 may have a 10 to 1 ratio. Together, they have a 12 to 1 ratio. If, however, the first transformer section 53 is "removed" by short-circuiting its secondary winding, the ratio becomes 10 to 1. Relative to the primary, the secondary voltage will increase, and relative to the secondary, the primary current will increase.

The shorting switch 57 may be pulse-width-modulated to provide a continuously variable effective turns ratio. In the present example, the effective ratio is variable from 12 to 1 to 10 to 1. A variable transformer may have many more sections to provide a variable effective turns ratio over a much greater range, but the present example is useful for adjusting the output voltage for small variation in the input voltage and for load regulation.

The pfc ac-dc converter 21 of FIG. 2 is preferably operated at with a fixed voltage input, though some line variation is tolerable. Many application require operation at one of the "universal" input voltages, 100 V ac, for Japan, 120 V ac for the USA and some other countries, or 240 V ac for most of the rest of the world. There is some merit to providing the isolation on the input side of the converter because then the output can be connected to the load with no further conditioning.

FIG. 14 shows three transformers 100, 101 and 103 that have, respectively, 5 to 1, 6 to 1 and 12 to 1 turns ratios so that the output can be a fixed 20 volts when connected to one of the universal inputs. It is contemplated that if the transformer is connected to the incorrect voltage, the circuit will not operate, but neither will it be damaged.

FIG. 15 shows a transformer 103 that can be tapped for different voltage operation. A first tap 104 is for 100 V ac operation. A second tap 105 is for 120 V ac operation, and a third tap 106 is for 240 V ac operation. It is contemplated that if the transformer is connected incorrect for the input voltage, the circuit will not operate, but neither will it be damaged.

FIG. 16 shows a half-bridge ac transformer-rectifier circuit 120 that is suitable as an input for the circuit 21 of FIG. 2. An ac half-bridge primary circuit 121 provides excitation for a transformer 130. A full wave synchronous rectified secondary circuit 122 provides a full wave rectified isolated output with reduced voltage. Primary windings 125 and 126 are a split primary winding for the transformer 130. In FIG. 16, a connection 127 is shown for 240 V ac input.

The half-bridge capacitors 123 and 123 and the ac switches 127 and 128 complete the primary circuit 121. The primary circuit 121 will operate for either polarity of the ac input voltage, so no input rectifiers are needed. When the ac voltage reverses polarity, so will the polarity of the charge on the half bridge capacitors 123 and 124. Compared to the switching frequency, the line frequency is very slow, so this is not a problem.

On the secondary side of the transformer 130, push-pull secondary windings 131 and 132 are connected to synchronous rectifiers 133 and 134 and then to an output capacitor 135. With correct phasing relative to the switching of the primary switches 127 and 128, the output polarity will be positive for either polarity of primary excitation.

FIG. 17 shows an alternate connection 141a and 141b for the primary windings 125 and 126 for operation from 120 V ac.

FIG. 18 shows an alternate connection 142a and 142b for the primary windings 125 and 126 for operation from 100 V ac.

Note that the switching circuits described in this specification are simplified schematics, to highlight the teachings of the invention without undue clutter. One skilled in the art of power converters and like circuits would understand how to use the invention and provide other circuits and components necessary for practical circuits without undue experimentation. As illustrations, not limitations, there may be snubbers, clamps, EMI filters, power supplies and conditioning circuits, surge protection, over current protection, and so forth. There may be additional logic and measurement circuits, and control and driver integrated circuits. There may be additional digital logic or analog circuits within or associated with a circuit to meet the requirements of a particular application.

In particular, one skilled in the art of power converters would know how to implement the various driver circuits for the various switches, the primary excitation, the rectifiers and the ac switches. He would know how to implement the timing and control circuits for pulse width modulation, phasing, interleaving and so forth, and he would know how to compensate the feedback control. A commercial power converter has a number of accessory functions that are not described here as they are not at the heart of the invention, yet they must be included in the commercial power supply. One skilled in the art of power converters would know how to use this invention as taught by this specification and would know how to integrate the accessory functions, timing and controls to make a practical power converter without undue experimentation.

In this specification and the claims, a "variable dc-dc transformer" is as described in U.S. patent application Ser. No. 11/423,957, filed Jun. 14, 2006 and entitled "Variable Transformer". Other embodiments of variable dc-dc transformers are described in U.S. Pat. No. 4,665,357, issued May 12, 1987, and entitled "Flat Matrix Transformers."

The preferred embodiments of the invention comprise a buck-equivalent circuit and a variable dc-dc transformer in series. In a series circuit, the order of the series components is not of consequence, fundamentally, though it will affect the detail design. In this specification and the claims, if a sequence of series components is specified, it includes all other possible sequences in series of those or equivalent components. Power converters are usually reciprocal if the necessary adjustments are made to the detail design to accommodate the reversed direction of current flow. In this specification and the claims, recitation of the components of a power converter of this invention includes its reciprocal, that is, an equivalent circuit in which the power flow is reversed, wherein an output becomes the input and vice versa.

DEFINITIONS (Connected) in a series connection: This defines a circuit path from a defined input point through a series of components to a defined output point such that the input of the first component is connected to the input point, the output of the first component is connected to the input of the second component and so forth until the output of the last component in the series path is connected to the outpoint point. Inherent in the phrase is the fact that each component has an input terminal and an output terminal and that there is a connection means between them. By so defining "in a series connection" the claims are less cluttered with matter that is not essential to the teaching of the invention and that a person familiar with the art of power converters would understand and could use without undue experimentation.

Rms: an abbreviation for "root mean square". With respect to an ac voltage, an ac current, a full wave ac voltage or a full wave ac current having a generally sinusoidal waveform it is $(1/\sqrt{2})$, or approximately 0.7 times the peak value of the voltage or current.

Full wave rectified ac (voltage or current): An ac voltage or current that has been rectified by a full wave rectifying means. Whereas the ac voltage or current has a wave form of the form Vp(SinX) or Ip(SinX), the full wave rectified voltage or current has the waveform of the form Vp|SinX| or Ip|SinX|, where Vp is the peak voltage magnitude, Ip is the peak current magnitude and X is the phase angle.

On, off, (for a switch): On refers to a condition of a switch when it is enabled to conduct by a control means. Off refers to a condition of a switch when it is disabled to conduct by a control means. "On" or "off", when referring to a switch, inherently defines that there is a control for turning the switch on or off in the required manner to perform the intended function of the switch. By so defining "on" and "off" with respect to a switch, the claims are less cluttered with matter that is not essential to the teaching of the invention and that which a person familiar with the art of power converters would understand and could use without undue experimentation.

Forward biased, reversed biased, conducting, on, off (for a rectifier): "Forward biased", "conducting" or "on" means that the anode of the rectifier is positive with respect to the cathode and the rectifier is conducting. "Reversed biased" or "off" means that the anode of the rectifier is negative with respect to the cathode and the rectifier is not conducting (ignoring leakage or Zener conduction). In some circuits, a rectifier may be either a junction rectifier or a synchronous rectifier. Where a state refers to the condition of a rectifier which may be either type of either type of rectifier, the definition of "on" and "off" for a switch applies if it is a synchronous rectifier.

Control by pulse width modulation: Control by pulse width modulation" means that a switch is turned on and off by a control means in the required manner perform the intended control function, usually with a duty cycle that is defined by a control algorithm and often with feedback for more precision of control. "Controlled by pulse width modulation," "on," or "off", when referring to a switch, inherently defines that there is a control for turning the switch on or off in the required manner to perform the intended function of the switch. By so defining "controlled by pulse width modulation," "on," and "off" with respect to a switch, the claims are less cluttered with matter that is not essential to the teaching of the invention and that a person familiar with the art of power converters would understand and could use without undue experimentation.

Control for power factor correction: A control by pulse width modulation or other control means such that the input current is power factor corrected, that is, the power factor is approximately one. At steady state conditions, the waveform of the current approximates the waveform of the voltage. "Control for power factor correction" inherently defines that there is a control means that can provide the necessary stimuli to perform the required function in the manner disclosed by this specification. There are many control circuits available to a designer, analog controls, digital controls, mixed controls, computer controls, digital processors and so forth, all of which would be familiar to one skilled in the art of power converters. By so defining "control for power factor correction," the claims are less cluttered with matter that is not essential to the teaching of the invention and that a person familiar with the art of power converters would understand and could use without undue experimentation.

Feedback control: A control in which a value to be controlled, such as an output voltage, is measured, compared against a reference and an error signal is "fed back" to the control means to adjust the control function to make the value to be controlled more precise. "Feedback control" inherently defines that there is a control means that can provide the necessary stimuli to perform the required feedback control function. There are many control circuits available to a designer, analog controls, digital controls, mixed controls, computer controls, digital processors and so forth, all of which would be familiar to one skilled in the art of power converters. By so defining "feedback control," the claims are less cluttered with matter that is not essential to the teaching of the invention and that a person familiar with the art of power converters would understand and could use without undue experimentation.

Boost post regulator: A post regulator is a circuit connected to the output of a power converter or similar circuit for adjusting the output voltage to be more precise. A boost post regulator comprises an inductor, a boost switch, a boost rectifier, and output capacitor and a control circuit. When used on the output of a buck derived circuit, such as the single phase pfc ac-dc converter of this invention, the buck output inductor can function as the boost inductor, so only the boost switch, the boost rectifier and the control means needs be added. The original output filter capacitor remains connected to the output.

Dc-dc transformer: A "dc-dc transformer" is a circuit for performing the same function for dc voltages and currents that a conventional transformer does for ac voltages and currents. The circuit comprises a primary drive circuit to provide an ac excitation to a transformer and a rectifying circuit to full wave rectify the output of the transformer. Reciting a "dc-dc transformer" includes, by definition, all of the components and controls necessary for its function.

Variable dc-dc transformer: A "variable dc-dc transformer" is a dc-dc transformer in which the effective turns ratio of the transformer may be varied by electronic control. See U.S. patent application Ser. No. 11/423,957, filed Jun. 14, 2006 and entitled "Variable Transformer". This patent application is incorporated herein by reference. Reciting a "variable dc-dc transformer" includes, by definition, all of the components and controls necessary for its function.

Transformer-rectifier: A "transformer-rectifier" is, as its name implies, the combination of a transformer with secondary rectifiers to receive an ac voltage and current and output a dc voltage and current. As an example, not a limitation, it may be the circuit of FIGS. 16 through 18. In this example, the circuit included a high frequency switching circuit so that the transformer may switch at a high frequency yet deliver an output that is faithful to the line frequency ac voltage and current. Reciting a "transformer-rectifier" includes, by definition, all of the components and controls necessary for its function.

The invention claimed is:

1. A single-phase power factor correcting ac-dc converter having an input for receiving a full-wave rectified ac input voltage and an input current, an output for putting out a dc output voltage, and a common return, comprising
 a main power path in a series connection from the input to the output comprising
  an input inductor,
  a boost switch,
  a first buck switch, and
  an output inductor, and
 a storage energy path in a series connection from a connection of the input inductor with the boost switch to a connection of the first buck switch with the output inductor comprising
  a boost rectifier, and
  a second buck switch,
 there also being
  a buffer capacitor connected from a connection of the boost switch with the first buck switch to the common return, a storage capacitor for storing energy connected from a connection of the boost rectifier with the second buck switch to the common return,
a catch rectifier switch connected from the connection of the first buck switch with the output inductor to the common return, and
an output filter capacitor connected from the output to the common return,
the single-phase power factor correcting ac-dc converter further having at least
a first mode of operation for when the full wave rectified ac voltage is below its rms voltage, and
a second mode of operation for when the full wave rectified ac voltage is above its rms voltage,
the first mode of operation comprising:
the boost switch is on,
the boost rectifier is reverse-biased,
the first buck switch controls by pulse width modulation the input current for power factor correction,
the second buck switch controls by pulse width modulation the output dc voltage, and
the catch rectifier conducts a current of the output inductor when the first and second buck switches are off, and
the second mode of operation comprising:
the first buck switch is on,
the second buck switch is off
the boost switch controls by pulse width modulation the output dc voltage, and
the boost rectifier is forward biased when the boost switch is off.

2. The power factor correcting ac-dc converter of claim 1 wherein the dc voltage is controlled by pulse width modulation to be in the order of a voltage on the storage capacitor times $1/(1+\sqrt{2})$.

3. The power factor correcting ac-dc converter of claim 1 wherein the dc voltage is controlled by pulse width modulation to be a precise value by feedback control from the dc voltage.

4. The power factor correcting ac-dc converter of claim 1 further comprising a boost post regulator connected to the output.

5. The power factor correcting ac-dc converter of claim 1 further comprising a dc-dc transformer connected to the output.

6. The power factor correcting ac-dc converter of claim 5 wherein the dc-dc transformer is a variable dc-dc transformer.

7. The power factor correcting ac-dc converter of claim 1 further comprising a transformer-rectifier on its input to provide the full-wave rectified ac input voltage from an ac voltage source.

8. The power factor correcting ac-dc converter of claim 6 wherein the transformer-rectifier has a plurality of taps to accommodate a plurality of levels of the ac input voltage.

9. The power factor correcting ac-dc converter of claim 1 wherein the catch rectifier is a synchronous rectifier.

10. The power factor correcting ac-dc converter of claim 1 wherein the boost rectifier is a synchronous rectifier.

11. A single-phase power factor correcting ac-dc converter having a first input and a second input for receiving an ac input voltage and an input current, an output for putting out a dc output voltage, and a common output return, comprising
a first main power path in a series connection from the first input to the output comprising
at least a first input inductor,
a first boost switch,
a first buck switch, and
an output inductor, and
a first storage energy path in a series connection from a connection of the input inductor with the first boost switch to a connection of the first buck switch with the output inductor comprising
a first boost rectifier, and
a second buck switch,
a second main power path in a series connection from the second input to a connection of the first boost switch with the first buck switch comprising
a second boost switch
a second storage energy path in a series connection from the second input to a connection of the first boost rectifier with the second buck switch compising
a second boost rectifier
a first ac return path in a series connection from the first input to the common output return comprising
a first return rectifier, and
a second ac return path in a series connection from the second input to the common output return comprising
a second return rectifier,
there also being
a buffer capacitor connected from a connection of the first boost switch with the first buck switch to the common output return,
a storage capacitor for storing energy connected from a connection of the first boost rectifier with the second buck switch to the common output return,
a catch rectifier switch connected from the connection of the first buck switch with the output inductor to the common output return, and
an output filter capacitor connected from the output to the common output return,
when the ac input voltage is positive when referenced from the first input to the second input
the second return rectifier is forward-biased and
the first return rectifier is reverse-biased,
when the ac input voltage is negative when referenced from the first input to the second input
the first return rectifier is forward-biased and
the second return rectifier is reverse-biased,
the single-phase power factor correcting ac-dc converter further having at least
a first mode of operation for when the magnitude of the ac input voltage is below its rms voltage, and
a second mode of operation for when the magnitude of the ac input voltage is above its rms voltage,
the first mode of operation comprising:
when the ac input voltage is positive when referenced from the first input to the second input
the first boost switch is on, and
the second boost switch is off,
when the ac input voltage is negative when referenced from the first input to the second input
the second boost switch is on and
the first boost switch is off,
the first and second boost rectifiers are reverse-biased,
the first buck switch controls by pulse width modulation the input current for power factor correction,
the second buck switch controls by pulse width modulation the output dc voltage, and
the catch rectifier conducts a current of the output inductor when the first and second buck switches are off, and
the second mode of operation comprising:
the first buck switch is on and
the second buck switch is off when the ac input voltage is positive when referenced from
   the first input to the second input
      the first boost switch controls by pulse width modulation
         the output voltage, and
      the second boost switch is off
      the first boost rectifier is forward-biased when the first
         boost switch is off, and
      the second boost rectifier is reversed-biased
   when the ac input voltage is negative when referenced from
      the first input to the second input
         the second boost switch controls by pulse width modulation the output voltage, and
         the first boost switch is off
         the second boost rectifier is forward-biased when the
            second boost switch is off, and
         the first boost rectifier is reversed-biased.

12. The power factor correcting ac-dc converter of claim 11 wherein the dc voltage is controlled by pulse width modulation to be in the order of a voltage on the storage capacitor times $1/(1+\sqrt{2})$.

13. The power factor correcting ac-dc converter of claim 11 wherein the dc voltage is controlled by pulse width modulation to be a precise value by feedback control from the dc voltage.

14. The power factor correcting ac-dc converter of claim 11 further comprising a boost post regulator connected to the output.

15. The power factor correcting ac-dc converter of claim 11 further comprising a dc-dc transformer connected to the output.

16. The power factor correcting ac-dc converter of claim 15 wherein the dc-dc transformer is a variable dc-dc transformer.

17. The power factor correcting ac-dc converter of claim 1 further comprising a transformer on its input to provide the ac input voltage as an isolated ac voltage from a non-isolated ac voltage source.

18. The power factor correcting ac-dc converter of claim 17 wherein the transformer has a plurality of taps to accommodate a plurality of levels of the ac input voltage from the non-isolated ac voltage source.

19. The power factor correcting ac-dc converter of claim 11 wherein the catch rectifier is a synchronous rectifier.

20. The power factor correcting ac-dc converter of claim 11 wherein the first and second boost rectifiers are synchronous rectifiers.

21. The power factor correcting ac-dc converter of claim 11 wherein the first and second return rectifiers are synchronous rectifiers.

22. The power factor correcting ac-dc converter of claim 11 further comprising
   a second input inductor connected in a series connection between the second input and the second boost switch.

* * * * *